(No Model.)

H. WINGER.
HARROW.

No. 330,952. Patented Nov. 24, 1885.

Witnesses:

Henry Winger, Inventor.
By Jno. Crowell
Attorney.

UNITED STATES PATENT OFFICE.

HENRY WINGER, OF MARSHALLVILLE, OHIO.

HARROW.

SPECIFICATION forming part of Letters Patent No. 330,952, dated November 24, 1885.

Application filed March 7, 1885. Serial No. 158,031. (No model.)

*To all whom it may concern:*

Be it known that I, HENRY WINGER, of Marshallville, in the county of Wayne and State of Ohio, have invented certain new and useful Improvements in Harrows; and I do hereby declare the following to be a full, clear, and exact description of the invention, such as will enable others skilled in the art to which it pertains to make and use the same.

My invention relates to an improvement in harrows; and it consists in the parts and combinations of parts, as will be more fully described, and pointed out in the claims.

Figure 1:
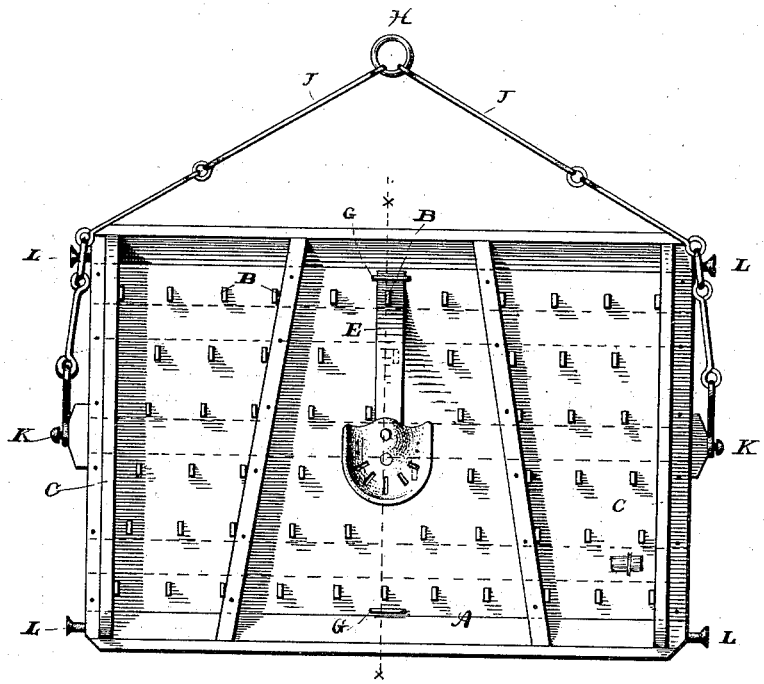
Figure 2:
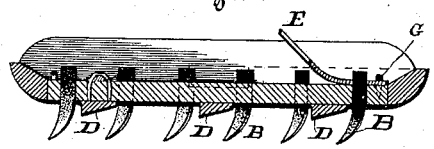
Figure 3:
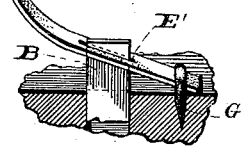

In the drawings, Figure 1 is a plan view of a riding-harrow constructed according to my invention. Fig. 2 is a vertical sectional view through the line $x\ x$ of Fig. 1. Fig. 3 is a detached view of a portion of my improved harrow-seat support, showing the manner of attaching it to the harrow.

In the drawings, A represents the platform of the harrow, which in harrows of this character are made solid, as shown. Through this platform the teeth B pass, extending a short distance above the top of the platform, and a sufficient distance below to perform the ordinary functions of harrow-teeth.

I prefer to use in the construction of my harrow that class of teeth known as "knife-teeth." At either side of the platform are secured runners C C, by means of which, when the harrow is turned upside down, it can be readily drawn from place to place.

D are detachable bars secured to and across the bottom of the harrow-platform. These bars D, I prefer to make triangular in cross-section, as shown in the drawings, and my harrow is so constructed as to permit it to be drawn either end forward, thus presenting to the front either the vertical face of the cross-bar or the angular face, as desired.

The object of this portion of the device is to furnish means, in connection with the harrow-teeth, for crushing the clods, which, especially in clay ground, are hard to pulverize simply with harrow-teeth. Rollers are generally used for this purpose; but I find that bars of the style shown secured to the harrow do the work thoroughly and avoid the necessity of going over the ground with a second tool.

E is a standard for the support of the seat F, and is preferably made of spring metal. It is provided with a slot, E', large enough to permit the free passage of the head of a tooth B, which secures it from lateral displacement when in position.

G is a staple fastened to the platform of the harrow, and secures the end of the spring-metal standard E, thereby preventing its vertical displacement. One of these staples G is placed at either end of the harrow, permitting the ready shifting and adjustment of the seat when it is desired to move the harrow in an opposite direction.

H is a link to which the double-trees are attached. This link in turn is secured to chains J, which are pivotally secured to the harrow-frame near its center, as shown at K K.

The object of this portion of my invention is to provide a ready means for changing the front of the harrow when in use, and another object is to assist materially in inverting the harrow when it is desired to do so. This is accomplished by disconnecting the chains from the hooks L, slightly elevating the rear end of the harrow, so as to bring the forward end in contact with the ground, and starting the team.

L L are hooks or suitable supports for the chain J J, and are placed in pairs at the side of the front and rear of the harrow. The object of these supports is to keep the chain in its proper position.

What I claim as my invention, and desire to secure by Letters Patent, is—

1. The combination, with a harrow having teeth projecting from one face thereof, and provided at its opposite side edges, near the center, with bearings or projections, of draft mechanism pivoted to said bearings or projections, by means of which the harrow can be drawn in either direction and inverted, substantially as set forth.

2. The combination, with a harrow consisting, essentially, of a platform or frame, having teeth projecting from one face thereof, runners secured to the other face or side of said platform or frame, and bearings secured to the opposite side edges of the frame, at or near the center thereof, of draft mechanism loosely secured to said bearings and hooks secured to the ends of the frame, substantially as set forth.

In testimony whereof I sign this specification, in the presence of two witnesses, this 2d day of February, 1885.

HENRY WINGER.

Witnesses:
S. J. HOCHSTETLER,
S. H. MILLER.